US008666316B2

(12) United States Patent
Hoerdum et al.

(10) Patent No.: US 8,666,316 B2
(45) Date of Patent: Mar. 4, 2014

(54) CONTAINER COMMUNICATION MODULE

(75) Inventors: Jens Hoerdum, Hoerning (DK); Palle Joergensen, Kolind (DK); Robert Svensson, Hoejbjerg (DK); Rasmus Drenck, Hasselager (DK)

(73) Assignee: Emerson Climate Technologies—Transportation Solutions ApS, Hoejbjerg (DK)

( * ) Notice: Subject to any disclaimer, the term of this patent is extended or adjusted under 35 U.S.C. 154(b) by 90 days.

(21) Appl. No.: 13/129,620

(22) PCT Filed: Nov. 17, 2009

(86) PCT No.: PCT/DK2009/000239
§ 371 (c)(1),
(2), (4) Date: Jun. 21, 2011

(87) PCT Pub. No.: WO2010/054658
PCT Pub. Date: May 20, 2010

(65) Prior Publication Data
US 2011/0263205 A1    Oct. 27, 2011

(30) Foreign Application Priority Data

Nov. 17, 2008  (DK) ................................. 2008 01597
Jan. 13, 2009  (DK) ................................. 2009 00044

(51) Int. Cl.
*H04B 7/00* (2006.01)
(52) U.S. Cl.
USPC ..................... 455/41.2; 455/552.1; 455/553.1
(58) Field of Classification Search
USPC ............... 455/41.2, 403, 552.1, 553.1, 554.2, 455/556.1, 560
See application file for complete search history.

(56) References Cited

U.S. PATENT DOCUMENTS 7,323,981 B2    1/2008  Peel et al.
7,529,561 B2 *  5/2009  Heinonen et al. .......... 455/552.1
(Continued)

FOREIGN PATENT DOCUMENTS

DE    199 29 037 A1    1/2001
JP    2005-252435 A    9/2005
(Continued)

OTHER PUBLICATIONS

L. Ruiz-Garcia, P. Barreiro, J. Rodriguez-Bermejo and J.I. Robia, Review. Monitoring the Intermodal, Refrigerated Transport of Fruit Using Sensor Networks, Spanish Journal of Agricultural Research 2007 5(2), pp. 142-156, See p. 150, Right Column, Table 2 and p. 152 Last Two Paragraphs.
Japanese Patent Office Office Action Dated Sep. 17, 2013 Corresponding Japanese Application No. 2011-535877 and English Translation.

(Continued)

*Primary Examiner* — Tuan H Nguyen
(74) *Attorney, Agent, or Firm* — Roberts Mlotkowski Safran & Cole, P.C.; David S. Safran

(57) ABSTRACT

Systems and method for safely distributing software for electronic controllers in the refrigeration container industry, and also communication systems primarily for electronic controllers related to refrigeration containers in which fast software distribution in container controllers is achieved by introducing a buffer memory in the communication system, which buffer memory includes a new container controller software version. The communication system distributes the new container controller software version by a communication device, to receiving communication systems where the new software version is placed in the buffer memory. As a result, it can be achieved that software distribution starts automatically as soon as only one communication system includes the new software version, this software version will in a very short period be spread into all container controllers, e.g., on board a ship or in a container yard.

12 Claims, 6 Drawing Sheets

(56) References Cited

U.S. PATENT DOCUMENTS

| | | | |
|---|---|---|---|
| 8,245,220 B2 * | 8/2012 | Imamatsu | 717/173 |
| 2004/0196182 A1 | 10/2004 | Unnold | |
| 2007/0040647 A1 | 2/2007 | Saenz et al. | |
| 2008/0056191 A1 | 3/2008 | Heinonen et al. | |
| 2008/0090523 A1 | 4/2008 | Heinonen et al. | |

FOREIGN PATENT DOCUMENTS

| | | |
|---|---|---|
| JP | 2008-504185 A | 2/2008 |
| WO | 2007/123528 A1 | 11/2007 |

OTHER PUBLICATIONS

Gregory Hackmann, Chien-Liang Fok, Gruia-Catalin Roman, Chenyang Lu, Christopher Zuver, Kent English, John Meier, Demo Abstract: Agile Cargo Tracking Using Mobile Agents, Proceedings of the 3rd International Conference on Embedded Networked Sensor Systems, (SENSYS '05), ACM, Nov. 4, 2005, p. 303.

Aoi Hashizume, Takuya Miyamaru, Hiroshi Mineno, Yoshiaki Terashima, Yuichi Tokunaga and Tadanori Mizuno, The Efficient Software Distribution With Pipelining for Wireless Sensor Networks, IPSJ Symposium on Multimedia, Distribution, Cooperation and Mobile (DICOMO 2008), IPSJ, Jul. 2, 2008, vol. 2008, pp. 451-457, Partial English Translation.

* cited by examiner

CONTAINER COMMUNICATION MODULE

BACKGROUND OF THE INVENTION

1. Field of the Invention

The present invention relates to systems for communication primarily for electronic controllers related to refrigeration containers, where a number of containers are connected to a power source, where at least one electronic controller comprises means for communication.

2. Description of Related Art

The present invention further relates to a method for communication to and from communication systems where a number of containers are connected to a power source, where the method for communication performs bidirectional communication with other communication systems or a gateway unit.

US 2004/0196182 A1 concerns Intelligent Mobile Asset Management System for intelligently tracking and monitoring physical assets worldwide using solar cells, rechargeable battery, two-way satellite communications, a CPU with memory, sensors of various types and GPS in the device and a GIS (Geographic Information System) database for storing and reporting the location and condition of the asset. The apparatus is permanently mounted on the physical asset, e.g., a cargo container, portable construction equipment, etc., where it reports its position and condition to the based unit, based on, movement, a container door being opened, overheating, etc., time passage or on-demand, using satellite communication networks. These reporting criteria are controlled by the system and are set and reset as needed.

In this document, communication is performed directly to and from the containers to communication satellites. This is possible in terms of train and lorry transport, but in container ships only a limited number of containers will be able to communicate with the satellite.

U.S. Patent Application Publication 2007/0040647 A1 concerns System for Monitoring and Control of Transport Containers, which system comprises a unit and system for remote monitoring and controlling of various conditions in a container. The system includes a local wireless or cable (wired) network with a local station and access points positioned in the vicinity of location of containers, a remote central station connected with the Internet and a container mounted means for monitoring and control of reefer equipment, each of which includes a processor (CPU) and a transceiver of wireless local communication, a GPS-receiver and a transceiver of cellular communication. In addition the processor (CPU) of the device is connected to the controller of reefer equipment, while the transceiver of wireless local communication is made so that the creation of Personal Area Network (PAN) with mobile electronic devices (e.g., Notebook, Pocket PC, PDA) is possible, and establishment of wireless communication with a communication gateway of the said local network is also possible.

The document U.S. Pat. No. 7,323,981 B2 Container Tracking System describes shipping containers which are networked for transferring data between the shipping containers. The shipping containers include sensors for detecting hazardous conditions associated with the shipping containers. The hazardous condition sensed by any shipping container on a ship is transmitted through the network to a satellite transmitter and/or a radio transmitter for reporting to a central database.

U.S. Patent Application Publication 2008/0090523 A1 concerns container tracking unit. A short range radio is communicating with labour container units or by a gateway unit. The short range radio can communicate through another container unit to the gateway unit. The container unit also comprises a cellular network radio that can communicate to a cellular network. In operation, at first the container unit tries to get access to the gateway unit over the short range radio, and if that does not succeed, the cellular network radio is used to receive connection information.

U.S. Patent Application Publication 2008/0056191 A1 and corresponding to U.S. Pat. No. 7,529,561 B2 also concerns short range radio communication from a container unit to a gateway unit or through another container unit. In the pending application, cellular network radio is also used for further communication and for receiving setup information for the short range radio. In the description on page 3, line 0050, the short range radio 103 complies with the first 802.11 standard specified by the IEEE or some variants of the first 802.11 standard, such as 802.11b, or some technique intended for short range radio communications. Furthermore, the cellular network radio operates in at least one of the following networks: TDMA (time division multiple access), a GSM (global system for mobile communications) network, a CDMA (code division multiple access) network; a FDMA (frequency division multiple access) network, or a UMTS (universal mobile telecommunications system) network. Furthermore, it is described that the cellular network radio may be a multi-frequency phone such as GSM 900/GSM 1800/GSM 1900 phone.

All of the above-mentioned patent applications are limited to the use of a cellular network radio. These cellular network radios need to communicate via a cellular network, for example to a monitoring server. The limitation of the cellular network radio and a cellular network indicates that mobile phone communication is necessary at least for setting up the short range radio communication. This mobile communication can only be performed as long as there is a cellular network available.

Modern refrigerated containers are complex machinery which typically includes an electronic controller to manage at least the temperature control. The temperature needs to be maintained with sufficient accuracy to protect the cargo, while keeping energy consumption at a minimum. The temperature control has to be performed under very variable circumstances, high and low ambient temperatures, high and low ambient humidity and cargo being loaded at different conditions. This calls for a high level of sophistication which typically causes occasional software updates to improve operation and adapt to new conditions.

Updating software in refrigerated container electronic controllers is, however, is, however, a logistically difficult task. The containers are typically in operation, spread around the world in a global operation, and the need to access the container physically to load and activate new software, which is a manual process, is time-consuming and a logistical problem. While the software update process itself might be only a matter of minutes, the process of accessing the entire container fleet over a limited period of time to ensure that software updates are implemented within reasonable timeframe, is a virtually impossible task. Software distribution in a container fleet can take years before the software update is performed in all the electronic container controllers.

SUMMARY OF THE INVENTION

It is the object of this invention to achieve fast and safely software distribution in the refrigeration container industry.

The object can be fulfilled by using the technology described in the preamble to claim 1 if further modified if the electronic controller is connected to or integrated with the communication system, which communication system comprises at least one buffer memory, which buffer memory comprises new electronic controller software version, which communication system distributes the new electronic controller software version by the communication means towards a number of receiving communication systems, in which receiving communication system the new software version is placed in the buffer memory, which receiving communication system distributes the new software version to further receiving communication system.

Hereby it can be achieved that software distribution starts automatically as soon as only one communication system comprises the new software version, this software version will in a very short period be spread into all communication systems e.g. on board a ship or in a container yard. If only one of these containers are further transported on another ship or maybe by lorry transported to another container yard, the distribution process of all containers in the ship or the yard will take place in a short period of time. Once a communication system is loaded with new communication system software, the communication system is able to distribute such software to similar communication systems through the wireless interface when a communication system installed with a new container software is located in the vicinity of a container with a similar communication system without the said controller software the communication system is able to communicate with each other, determine the status of the electronic controller software and copy the electronic controller software, if necessary. This operation allows for fully automatic distribution of new electronic container controller software from a single communication system to multiple communication systems in a process that repeats itself exponentially and ensures that the electronic controller software in the refrigerated containers is updated fast and in a reliable manner.

A worldwide update of the container controller software can be performed substantially faster than today's manual process. This new update process is performed without any manual influence because none of the communication systems need to be connected to a computer system for downloading new software versions.

The buffer memory can keep the electronic controller software ready for load into the electronic controller placed in a refrigeration container. Placing the new software version in the buffer memory is very important because maybe new and old software versions are not able to communicate with other systems, e.g. on board a ship or in a container yard. Therefore, in some situations the introduction of a new software version need to wait until the update can be performed in all communication systems at the same time. Also in situations where a new update contains failures and the new update has to be deleted in all containers, it is important that the update of the software is temporarily loaded until it is released.

The load of new electronic controller software from the buffer memory into the container controller is performed after the communication system has received a command through a communication line or by the user. By controlling the release of the new software, it is possible to more or less synchronize the time for starting using the new software version. This also gives the possibility that one software version maybe never is to be installed because some failures have been indicated. In stead of sending the release information, it is possible also to send a delete message, so that the software in the buffer memory can be deleted instead of being installed.

Each communication system that has received a new software version start communication with other communication systems, where the communication systems exchange data concerning actual software version, where the new software version is transmitted to the communication systems operating with older software versions. Hereby it can be achieved that initially a communication system exchanges software versions with other communication systems in order to obtain information about actual software versions placed in the controller or if new software versions are placed in the buffer memory in one or more of the communication system inside the range of communication. If one of the electronic containers controllers contains new software version, this version will then automatically be transmitted to all electronic container controllers inside the range of communication. All these electronic container controllers will then start analyzing containers inside their range of communication to see if they contain the new software version and therefore, the new software version is then further transmitted to all communication systems of the electronic container controllers, e.g. on board a ship or in a container yard. As soon as new containers are added, the process will be repeated and if the software version is old or missing, the new software version will be transmitted to all electronic container controllers that ask for updating.

The communication system comprises one communication line in the form of power line communication or by a cellular network radio operating in at least one of the following networks: TDMA (time division multiple access), a GSM (global system for mobile communications) network, a CDMA (code division multiple access) network; a FDMA (frequency division multiple access) network, or a UMTS (universal mobile telecommunications system) network. In order to transmit data to or from the communication systems, they mostly comprise further communication means as mentioned. These communication means can be used for transmitting e.g. information of temperature or humidity of the inner of a container.

At least some of the communication to and from the communication systems can be performed by short range radio communication to and from other containers or a gateway unit, in which system new software versions are transmitted by the short range radio communication towards receiving communication systems placed inside the range of transmission for the short range radio communication.

The command for software distribution is received through a serial interface, which serial interface comprises interfaces to existing communication port on the refrigerated container. It is possible to communicate with a container through the power lines by a serial interface where signals are transmitted both ways at the power lines that are connected to the containers. This power line communication could also be used for sending the release information for the new software versions e.g. to all containers on board a ship.

The communication systems can communicate by short range radio communication which communication can be performed according to IEEE 802.15.4. The IEEE 802.15.4 which is the basis for ZigBee is only one of the possible solutions for short range radio communication between communication system software. Probably many other communication protocols could be used for this short range radio communication and probably new standards will be developed in the future. New frequency bands in the high end will be released in the future and new communication protocols for short range radio communication will then probably be released. By using the extremely high frequencies, the data range that can be transmitted over a very short time period will increase sufficiently from the data communication which we know today.

The communication system can performs a search and selection for open communication line between the communication methods previous described which communication system performs communication over the selected communication line.

The communication system can communicate by short range radio communication inside the ISM license free band.

The communication system can be formed as an add-on module, which module is connected to a refrigeration container controller.

In an alternately embodiment for the invention the communication system is integrated in an electronic refrigeration container controller.

The object can also be fulfilled by a method as described in the preamble to claim 8 if the method concerns transmission of new software versions for the electronic container controllers performed by the communication system, where a first communication system communicates the software version to other communication system, where, if a new software version is available, the communication system comprising the new software version transmits the new version to receiving communication system by communications methods supported by the communication system as previous described.

In this way introducing new software versions in a ship or container yard will be spread to all communication systems just as a virus is infecting an animal or human body. In a few hours, the whole ship or a whole container yard will contain the new software version in all communication systems. If the containers from the ship is spread into different harbours and into different container yards, the new software version will automatically be transmitted to all containers in the whole country in a very few days. If e.g. a manual distribution is performed in a few containers at different locations in the world, then a new software updating can be ready to be install in all communication systems in maybe one or two months from the first release of that software version. This period can in fact be reduced if e.g. the new software version is transmitted to container ships and then loaded just to one container by other means of communication than maybe the short range radio communication system. If a new software version is manually sent to every container ship in open sea, the software can be placed in just one of the containers. Then the automatic distribution process starts and more containers on board that ship will be updated maybe only hours later. In this way, a software update does not need to wait until all container ships are in harbour for receiving the new software version.

The communication to and from the communication systems can be performed as short range radio communication to and from the communication systems, and the method concerns use of short range radio communication for transmitting new software versions to other communication systems.

The load of new software can be performed after receiving acknowledge through a communication line or by the user.

The container controls cargo, and the container is controlled by software, the software is regularly updated to give the best performance and lowest energy consumption.

DETAILED DESCRIPTION OF THE INVENTION

Figure 1:
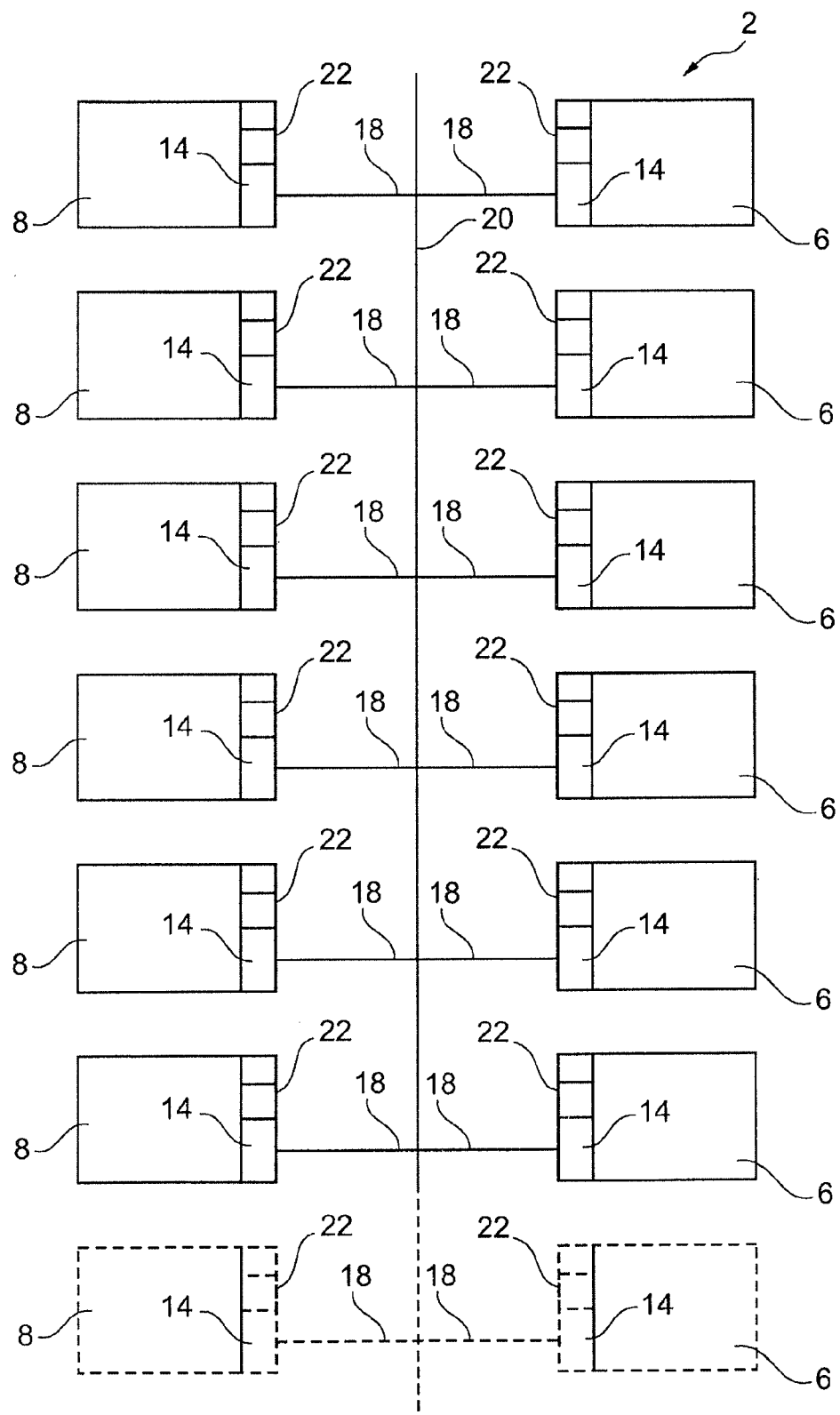
FIG. 1 shows a simplified diagram of a number of containers connected to a common grid.

FIG. 1 shows a simplified diagram of a number of containers connected to a common grid. A container storage 2 that comprises a first row of containers 6 and a second row of containers 8, each of the containers 6 and 8 are refrigeration containers which comprise a refrigeration module 14. All of the containers 6 and 8 are connected by means of a power cable 18 which is further connected to a common power cable 20. Each of the refrigeration modules 14 comprises a communication system 22. The communication system 22 can communicate by means of the power lines 18 by power line communication, but the communication systems 22 has also further communication means in the form of a short range radio communication system. By this short range radio communication, the communication systems 22 can communicate at least with other communication systems. If the communication system is a ZigBee communication net, then one container will work as a relay station for the next container and so on. By a ZigBee net several thousands of communication units can exchange information automatically by using each of the communication systems as a link that is simply further transmitting a message. The ZigBee communication net is highly effective for transmitting smaller data packages which are allowed to be delayed by retransmitting for a short time of period. In the pending application, the ZigBee net is used for transmitting new software versions for the communication systems so if only one of the communication systems 22 contains a new software version, this new software version is automatically transmitted to all other communication systems and they continue the process so a whole container yard or all containers on a ship can be updated in a very short period of time to a new software version.

Figure 2:
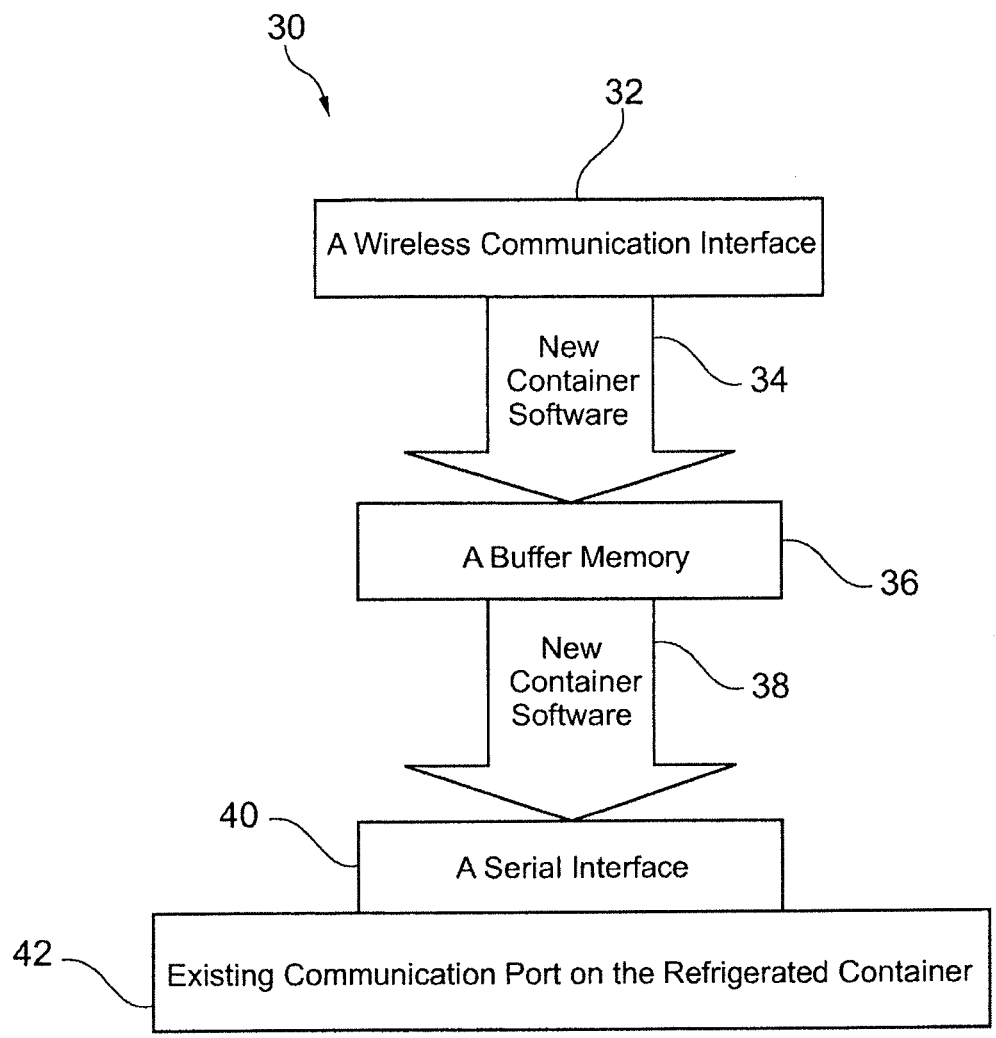
FIG. 2 shows a schematic diagram of the distribution process.

FIG. 2 shows a schematic diagram 30 of the distribution process. A wireless communication interface 32 receives new container software 44 which is stored in a buffer memory 36. The buffer memory communicates further that new container software has been received to a serial interface 40 which is e.g. part of the existing communication port on a refrigerated container 42. After receipt of accept from the serial interface 40, the new container software 48 can be accepted and be stored in the computer system so that the computer from then on starts using the new software version. In FIG. 2 the buffer memory can be applied as an external device.

Figure 3:
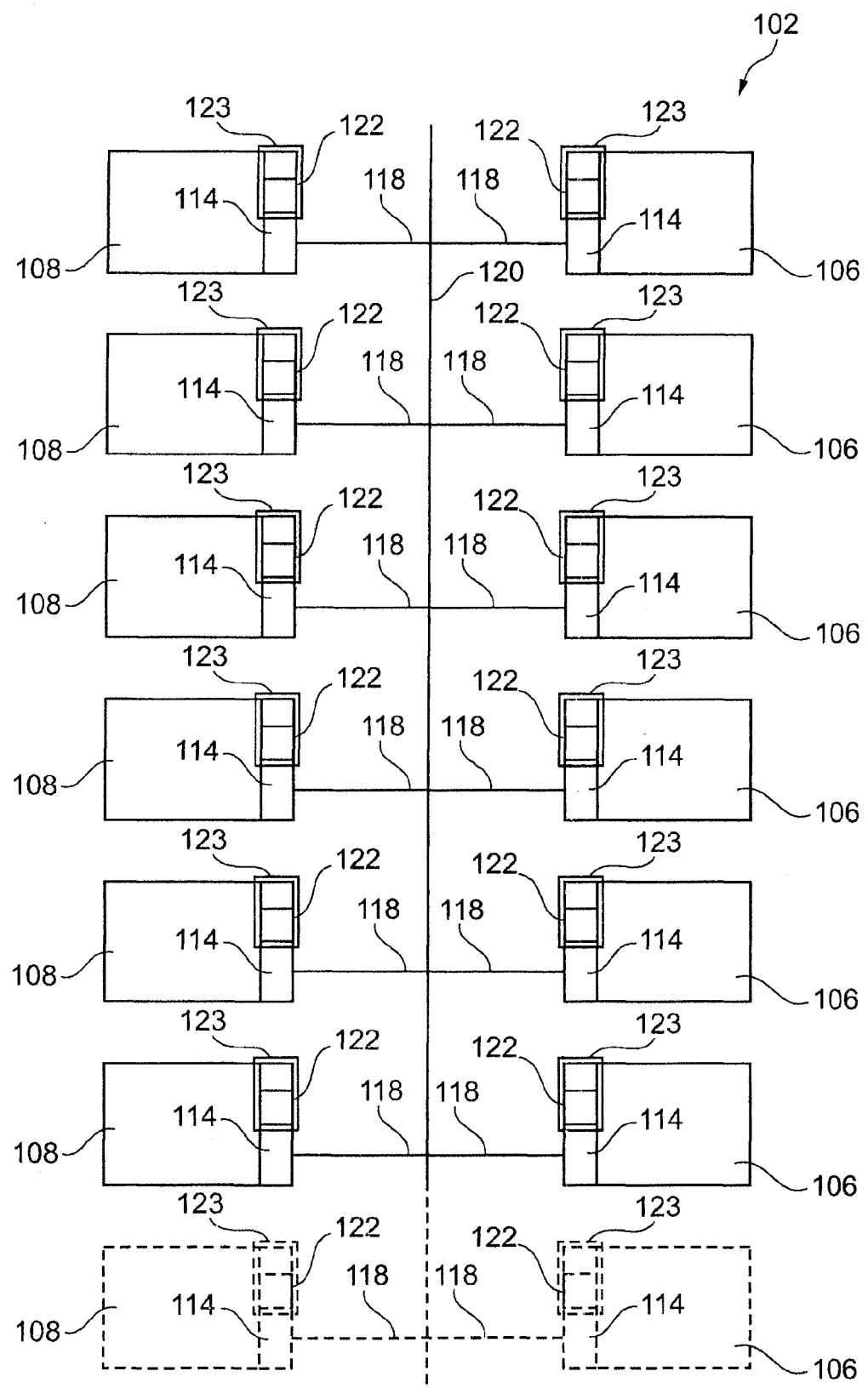
FIG. 3 shows a simplified diagram as FIG. 1 comprising a communications system.

FIG. 3 shows a simplified diagram just as FIG. 1 shows a number of containers connected to a grid. FIG. 3 shows a container storage 102 which could be on a container ship or containers stored in a container yard. The container storage 102 comprises a first row of containers 106 and a second row of containers 108. Each of the containers 106 and 108 are refrigeration containers which comprises a refrigeration module 114. All of the containers 106 and 108 are connected to a power line 118 which is further connected to a common power line 120. Each of the refrigeration modules 114 comprises a communication system 123 which communication system 123 is connected to the container controllers 122. The communication system 123 can perform communication through the power lines 118 or the communication system 123 comprises different kinds of radio communication systems. The different forms of communication could be communication by a cellular network radio operating e.g. in TDMA (time division multiple access) or a GSM (global system for mobile communication) network or a CDMA (code division multiple access) network or a FDMA (frequency division multiple access) network or an UMTS (universal mobile telecommunication system) network. Furthermore, the communication system 123 comprises a communication system towards other communication systems 123 or to a gateway unit where the communication is performed by a short range radio communication system. Preferably, a short range communication system is communicating inside the ISM license free band. By using the communication system 123 in relation to the container controllers 122 a new software version that is loaded into one communication system 123 can be transmitted by one of the previous described communication methods to further communication systems 123 in other container controllers 122. In this way, a new software version can be transmitted in a very short time period to a high number of electronic container controllers.

Figure 4:
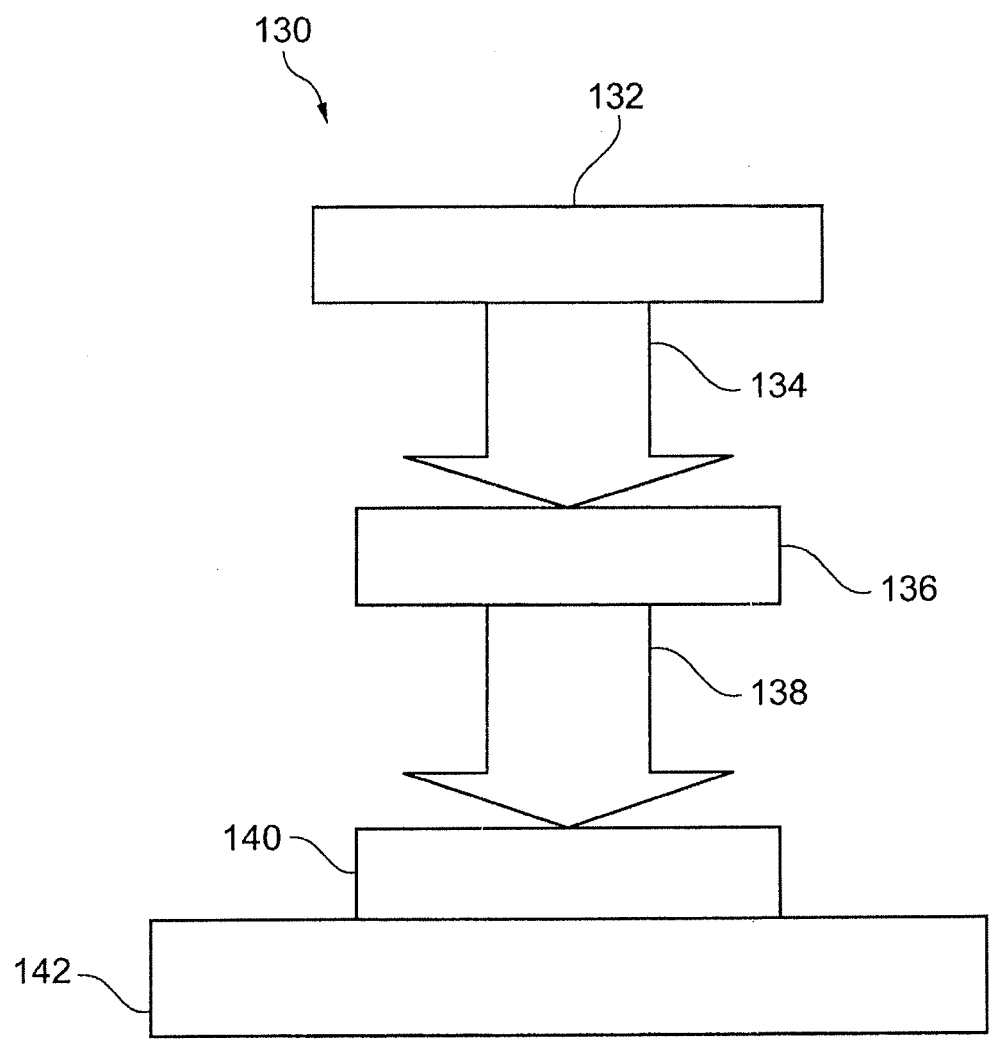
FIG. 4 shows a schematic diagram of the software distribution process.

FIG. 4 shows a schematic diagram 130 of the software distribution process. A wireless communication system 132 receives new electronic container controller software 134 which new electronic container controller software version 134 is stored in a buffer memory 136. The new electronic container controller software placed in the buffer memory 136 is transmitted upon receiving release information by the block 138 towards an interface 140 where the new electronic container controller software is placed in the electronic container controller software storage 142.

The new software version 134 which has been received can be stored for a period which could be days or even months in the buffer memory 136. The release information 138 could be transmitted over any of the previous described communication lines or the release command could come manually by an activation of a switch placed outside the communication module.

Figure 5:
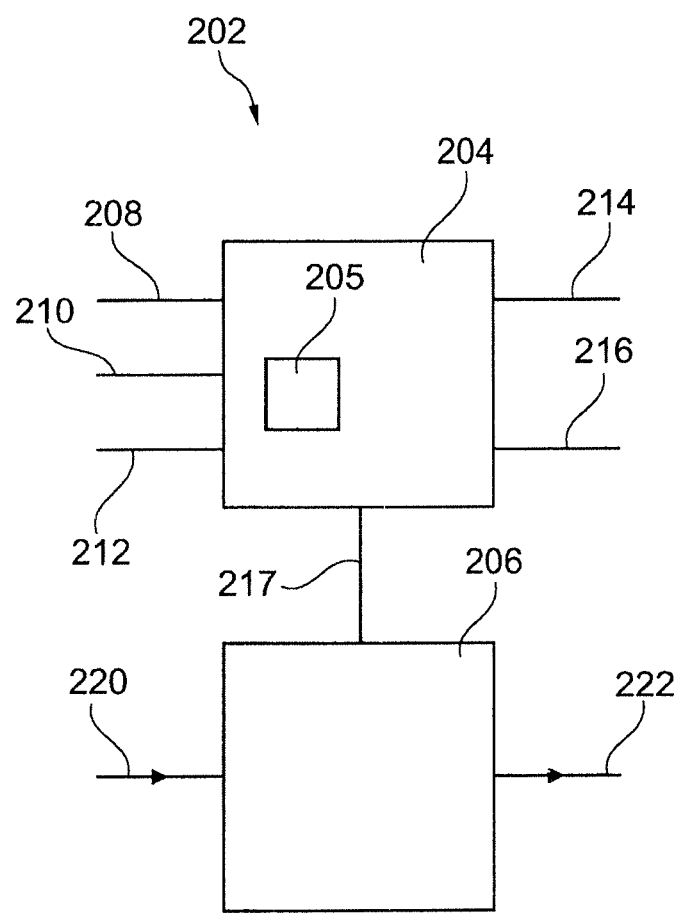
FIG. 5 shows an electronic container controller comprising a communication system and an electronic container controller.

FIG. 5 shows an electronic container controller 202 comprising a communication system 204 and an electronic container controller 206. The communication system 204 comprises a first GSM communication 208, a second ISM communication line 210 and a CDMA communication 212. Furthermore, a power line communication 214 is shown and with 216 is indicated that also further communication methods are possible. The communication system 204 further comprises a memory 205 for storing new software versions received by the communication system 204. Upon a release command, the software stored in the memory 205 is transmitted over the line 217 to the electronic container controller 206. The electronic container controller 206 receives input 220 from a refrigeration system and output 222 is transmitted towards the refrigeration system. FIG. 5 as such shows the communication 204 as an extra module that could be connected towards an existing electronic container controller 206. The line 217 could be an existing connection that already exists in electronic controllers for containers.

Figure 6:
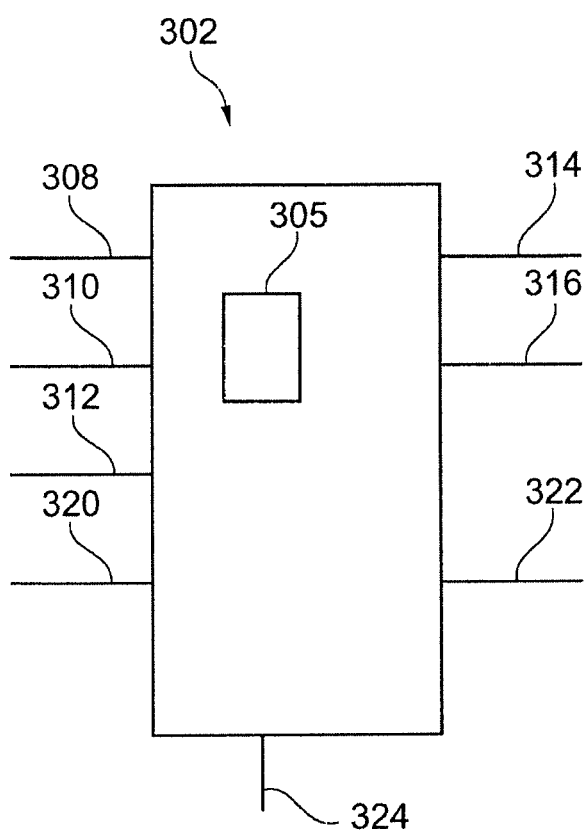
FIG. 6 shows an integrated electronic controller.

FIG. 6 shows an integrated electronic controller 302. In this controller 302, is the communication system as such integrated into the electronic controller 302. The electronic controller comprises an internal memory 305 and the integrated electronic controller has a GSM communication line 308, an ISM communication line 310 and a CDMA or UMTS communication line 312 and a power line communication 314 and by 316 is indicated further communication lines. The integrated electronic container controllers 302 further comprise input 320 from a refrigeration system and output lines 322 for the refrigeration system. Further is indicated a line 324 which could be a manual input which could be used for releasing a new software version stored in the memory 305 so that after activating the bottom, this software will be transmitted into the controller and an update will be performed.

What is claimed is:

1. Systems for communication primarily for electronic controllers related to refrigeration containers, where a number of containers are connected to a power source, where at least one electronic controllers comprises means for communication, wherein the electronic controller is connected to or integrated with a communication system, which communication system comprises at least one buffer memory, which buffer memory comprises new container software version, which communication system distributes the new container controller software version by the communication system towards one or more receiving communication systems, in which receiving communication systems, the new software version is placed in the buffer memory, which receiving communication systems distributes the new software version to further receiving communication systems, whereby the buffer memory keeps the electronic controller software version ready for load into the electronic controller placed in a refrigeration container, and whereby the load of new electronic controller software from the buffer memory into the container controller is performed after the communication system has received a command through a communication line or by the user.

2. System for communication according to claim 1, wherein a communication system that has received a new software version start communication with other communication system, where the communication system exchange data concerning actual software version, where the new software version is transmitted to the communication system storing older software versions.

3. System for communication according to claim 2, wherein the communication system, comprises one communication line in the form of power line communication or by a cellular network radio operating in at least one of the following networks: TDMA (time division multiple access), a GSM (global system for mobile communications) network, a CDMA (code division multiple access) network; a FDMA (frequency division multiple access) network, or a UMTS (universal mobile telecommunications system) network.

4. System for communication according to claim 3, wherein the communication system performs a search and selection for open communication line between the communication methods described in the claim 3 which communication system performs communication over the selected communication line.

5. System for communication according to claim 3, wherein the communication system communicates by short rage radio communication inside the ISM license free band.

6. System for communication according to claim 2, wherein at least some of the communication to and from the communication system is performed by short range radio communication to and from other communication system or a gateway unit, in which communication system new software versions are transmitted by the short range radio communication towards receiving communication systems placed inside the range of transmission for the short range radio communication.

7. System for communication according to claim 6, whereby the communication system performs a search and selection for an open communication line between the communication systems and performs communication over the selected communication line.

8. System for communication according to claim 1, wherein the communication system is formed as an add-on module, which module is connected to a refrigeration container controller.

9. System for communication according to claim 1, wherein the communication system is integrated in an electronic refrigeration container controller.

10. Methods for communication to and from communication systems where a number of containers are connected to a power source, where the method for communication performs bidirectional communication with other communication systems or a gateway unit, whereby the transmission of new software versions for the electronic controllers, are performed by the communication system, where a first communication system, communicates the software version to other communication system, where, when a new software version is available, the communication system comprising the new software version transmits the new version to a receiving communication system, whereby the load of new electronic controller software form the buffer memory into the container controller is performed after the communication system has received a command through a communication line or by the user, by communications methods supported by communication system.

11. Method according to claim 10, whereby the load of new software, into electronic controller, is performed after receiving acknowledge through a communication line or by the user.

12. Methods for communication to and from communication systems where a number of containers are connected to a power source, where the method for communication performs bidirectional communication with other communication systems or a gateway unit, whereby the transmission of new software versions for the electronic controllers, are performed by the communication system, where a first communication system, communicates the software version to other communication system, where, when a new software version is available, the communication system comprising the new software version transmits the new version to a receiving communication system, by communications methods supported by communication system, and whereby the load of new software, into electronic controller, is performed after receiving acknowledgment through a communication line or by the user.

* * * * *